United States Patent
Jain et al.

(10) Patent No.: US 10,049,284 B2
(45) Date of Patent: Aug. 14, 2018

(54) VISION-BASED RAIN DETECTION USING DEEP LEARNING

(71) Applicant: Ford Global Technologies, LLC, Dearborn, MI (US)

(72) Inventors: Jinesh J Jain, San Mateo, CA (US); Harpreetsingh Banvait, Sunnyvale, CA (US); Ashley Elizabeth Micks, Mountain View, CA (US); Vidya Nariyambut Murali, Sunnyvale, CA (US)

(73) Assignee: Ford Global Technologies, Dearborn, MI (US)

( * ) Notice: Subject to any disclaimer, the term of this patent is extended or adjusted under 35 U.S.C. 154(b) by 121 days.

(21) Appl. No.: 15/095,876

(22) Filed: Apr. 11, 2016

(65) Prior Publication Data

US 2017/0293808 A1      Oct. 12, 2017

(51) Int. Cl.
| | |
|---|---|
| *G06K 9/00* | (2006.01) |
| *G06K 9/62* | (2006.01) |
| *G06K 9/66* | (2006.01) |

(52) U.S. Cl.
CPC ....... *G06K 9/00791* (2013.01); *G06K 9/6256* (2013.01); *G06K 9/6284* (2013.01); *G06K 9/66* (2013.01)

(58) Field of Classification Search
None
See application file for complete search history.

(56) References Cited

U.S. PATENT DOCUMENTS

| | | | |
|---|---|---|---|
| 5,440,483 A * | 8/1995 | Badoche-Jacquet | .... G01S 13/95 702/3 |
| 5,923,027 A * | 7/1999 | Stam | ..... B60S 1/0822 15/DIG. 15 |
| 7,646,889 B2 | 1/2010 | Tsukamoto | |
| 8,797,417 B2 | 8/2014 | Gayko | |
| 9,045,112 B2 | 6/2015 | Kracker | |
| 9,465,987 B1 * | 10/2016 | Bell | ....... H04N 7/183 |

(Continued)

FOREIGN PATENT DOCUMENTS

| | | |
|---|---|---|
| KR | 20120064474 A | 6/2012 |
| WO | WO-2014032933 A1 | 3/2014 |
| WO | WO-2015165448 A1 | 11/2015 |

OTHER PUBLICATIONS

Detection of Raindrops on a Windshield From an In-Vehicle Video Camera, International Journal of Innovative Computing, Information and Control, vol. 3, No. 6(B), December.

(Continued)

*Primary Examiner* — Shervin Nakhjavan
(74) *Attorney, Agent, or Firm* — David R. Stevens; Stevens Law Group

(57) ABSTRACT

A method is disclosed for using a camera on-board a vehicle to determine whether precipitation is falling near the vehicle. The method may include obtaining multiple images. Each of the multiple images may be known to photographically depict a "rain" or a "no rain" condition. An artificial neural network may be trained on the multiple images. Later, the artificial neural network may analyze one or more images captured by a first camera secured to a first vehicle. Based on that analysis, the artificial neural network may classify the first vehicle as being in "rain" or "no rain" weather.

19 Claims, 4 Drawing Sheets

(56) References Cited

U.S. PATENT DOCUMENTS

| | | | |
|---|---|---|---|
| 9,637,053 B2 * | 5/2017 | Schofield | B60R 1/025 |
| 2004/0143380 A1 * | 7/2004 | Stam | B60Q 1/085 |
| | | | 701/36 |
| 2013/0275007 A1 * | 10/2013 | Chen | B60S 1/0833 |
| | | | 701/49 |
| 2014/0347487 A1 | 11/2014 | Ahiad | |
| 2015/0015711 A1 | 1/2015 | Ahiad | |
| 2016/0026865 A1 * | 1/2016 | Reynolds, Jr. | G06K 9/00624 |
| | | | 382/103 |

OTHER PUBLICATIONS

Environment Recognition Technologies for Supporting Safe Driving, Hitachi Review vol. 53 (2004), No. 4.

* cited by examiner

VISION-BASED RAIN DETECTION USING DEEP LEARNING

BACKGROUND

Field of the Invention

This invention relates to vehicular systems and more particularly to systems and methods for developing, training, and applying algorithms for detecting rain in a driving environment.

Background of the Invention

Rain and other precipitation can affect the functionality of vehicles. For example, rain can lower traction, enhance glare, impair vision, or the like. Accordingly, what is needed is a vehicular system and method for detecting and responding to rain and other precipitation.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
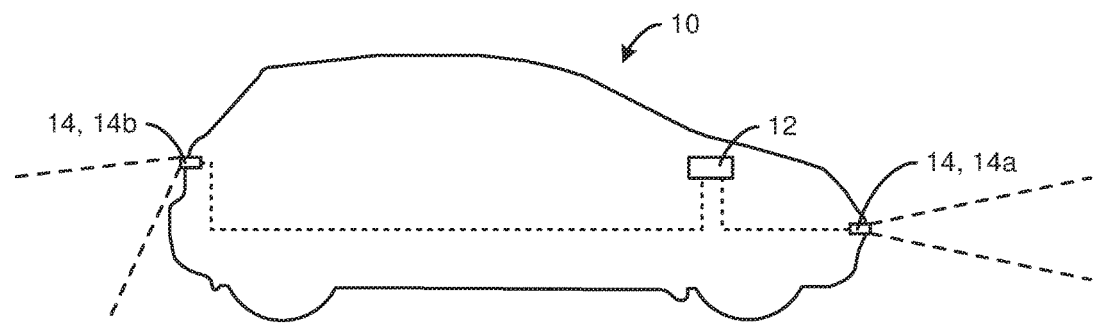
FIG. 1 is a schematic diagram illustrating one embodiment of a system in accordance with the present invention carried on-board a vehicle.

Referring to FIG. 1, the real world presents an array of conditions and obstacles that are ever changing. This reality creates significant challenges for vehicle-based systems providing autonomous control of certain vehicle functions or dynamics and/or autonomous driving. To overcome these challenges, a vehicle 10 may be equipped with sensors to sense a surrounding environment. However, each sensor added to a vehicle 10 adds cost and complexity.

Accordingly, a computer system 12 in accordance with the present invention may use software to extract additional functionality or utility from data output by one or more sensors that are already being carried on-board a vehicle 10. That is, a system 12 may augment the functionality or features to a vehicle 10 without adding any additional hardware to the vehicle 10.

For example, a system 12 in accordance with the present invention may be, include, or support vision-based precipitation detection using deep learning to differentiate between "rain" and "no rain" (or other "precipitation" or "no precipitation") classes or conditions. In selected embodiments, a system 12 may analyze image data collected or captured by one or more cameras 14 carried on-board a vehicle 10 (e.g., one or more forward facing cameras 14*a*, one or more rearward facing cameras 14*b*, one or more back-up cameras 14*b*, or the like or a combination or sub-combination thereof) to determine whether it is raining (or other precipitation such as sleet, snow, etc. is falling) in an environment surrounding the vehicle 10.

In certain embodiments, image data (e.g., video) captured by one or more cameras 14 may be processed by a system 12 as individual images or frames. An artificial neural network within a system 12 may operate on such images differently depending on whether the neural network is in training or implementation mode. In training mode, a neutral network within a system 12 may train on multiple images (e.g., dozens, hundreds, or thousands of images) from two different or opposite classes (e.g., rain and no-rain). The variability in the images and the scenes captured or reflected in such training data may be high to provide a reliable determination of class across various situations, scenarios, and environments.

Once trained, an artificial neural network may operate in implementation mode. In implementation mode, a neural network may be fed images and determine which class is represented therein. In selected embodiments, the determinations of a neural network may be presented in terms of percentages of confidence for each class or condition.

In selected embodiments, a neural network corresponding to a system 12 in accordance with the present invention may compare multiple consecutive images captured by a camera 14 over a short period of time (e.g., several images captured over a period of a few seconds). If a significant majority of the images are classified as a first condition (e.g., rain), a system 12 may determine that the first condition is present in the environment of the vehicle 10. A system 12 may make this determination even if a few of the images are classified as a second condition (e.g., no rain).

In certain embodiments, the classifying of one or more images in implementation mode may occur in real time with the capturing of those images. That is, an artificial neural network may quantify the correspondence of a particular image to one or more classes or conditions within a very short period of time after the capture of that particular image by a camera 14. In selected embodiments, that very short period of time may be about 10 seconds or less.

Figure 2:
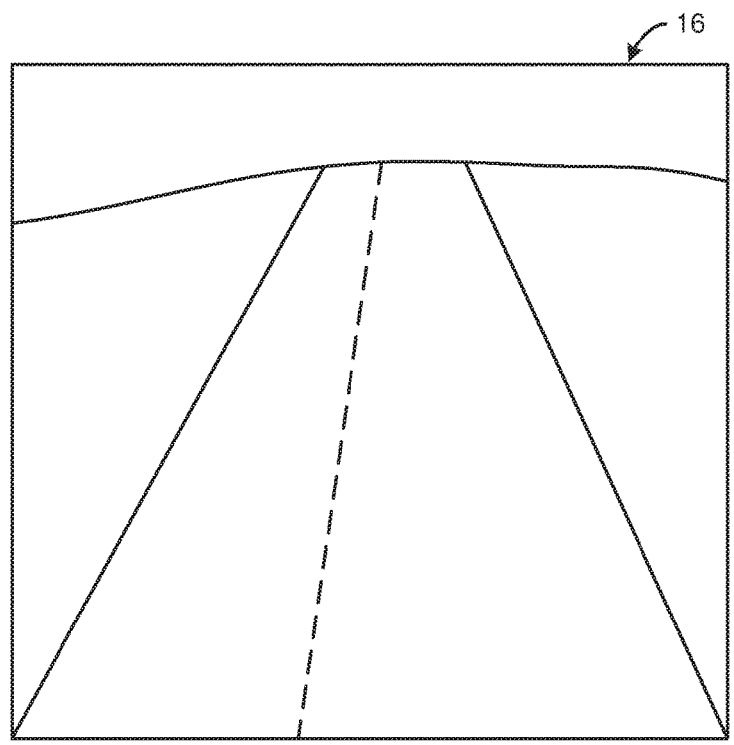
FIG. 2 is a schematic illustration of an image that may be captured by a camera of a system in accordance with the present invention.

Referring to FIG. 2, in selected embodiments, the classification performed by a system 12 may be agnostic to any particular feature contained within the one or more images 16 captured by a camera 14. That is, a neural network within a system 12 may not search an image 16 for any particular feature. Rather, a neural network may judge whether an image 16 in its entirety is more indicative of one class or another.

This agnosticism of a system 12 in accordance with the present invention may provide significant advantages. For example, each image 16 may be examined or analyzed "as is." That is, there may be no need for image pre-processing for a system 12 to function properly. Furthermore, no additional calibration may be needed. Moreover, a neural network may classify one or more images 16 without regard to weather a camera 14 that captured the one or more images 16 was fixed in an exact location, pointed more toward the sky, pointed more toward the road, pointed forward, pointed reward, or the like.

Figure 3:
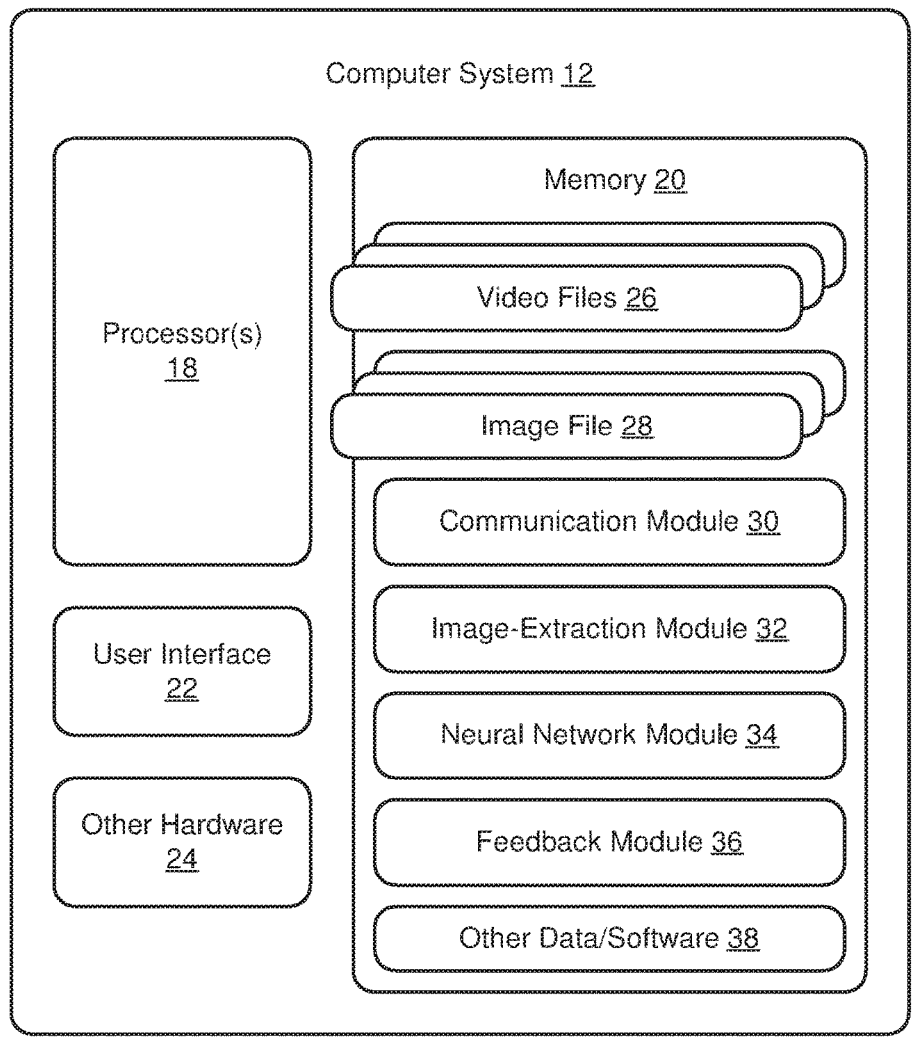
FIG. 3 is a schematic block diagram illustrating one embodiment of a system in accordance with the present invention.

Referring to FIG. 3, a system 12 in accordance with the present invention may be, include, or support vision-based precipitation detection using deep learning. A system 12 may accomplish this in any suitable manner. For example, a system 12 may be embodied as hardware, software, or some combination thereof.

In selected embodiments, a system 12 may include computer hardware and computer software. The computer hardware of a system 12 may include one or more processors 18, memory 20, a user interface 22, other hardware 24, or the like or a combination or sub-combination thereof. This computer hardware may be hardware already included as part of a vehicle 10. The memory 20 may be operably connected to the one or more processors 18 and store the computer software. This may enable the one or more processors 18 to execute the computer software. Thus, a system 12 may augment the functionality or features to a vehicle 10 by adding and/or modifying software and not by adding any additional hardware to the vehicle 10.

A user interface 22 of a system 12 may enable an engineer, technician, or the like to interact with, run, customize, or control various aspects of a system 12. In selected embodiments, a user interface 22 of a system 12 may include one or more keypads, keyboards, touch screens, pointing devices, or the like or a combination or sub-combination thereof. Alternatively, or in addition thereto, a user interface 22 may comprise a port through which one or more external computers may communicate with a system 12 or one or more components thereof.

In selected embodiments, the memory 20 of a system 12 may store (at least temporality) video 26 (e.g., one or more video files 26) collected or captured by one or more cameras 14. Alternatively, or in addition thereto, the memory 20 of a system 12 may store one or more images files 28 containing, defining, or corresponding to one or more images 16 captured by one or more cameras 14 or extracted from video collected or captured by one or more cameras 14. Additionally, the memory 20 may store one or more software modules. For example, the memory 20 may store a communication module 30, image-extraction module 32, neural network module 34, feedback module 36, other data or software 38, or the like or a combination or sub-combinations thereof.

A communication module 30 may enable data such as one or more video files 26, image files 28, software (e.g., one or more modules 30, 32, 34, 36, 38 or updates thereto) to be passed into or out of a system 12 in accordance with the present invention. For example, a communication module 30 forming part of a system 12 carried on-board a vehicle 10 may enable that system 12 to received an update to its neural network module 34. Accordingly, improvements developed off-board a vehicle 10 may be brought on-board as desired or necessary.

An image-extraction module 32 may extract one or more images 16 from video captured by one or more cameras 14. For example, an image-extraction module 32 may extract one or more images 16 (e.g., several images 16 captured over a period of a few seconds) from a video file 26 that is stored in memory 20, video that is being output by a camera 14, or the like. In selected embodiments, an image-extraction module 32 may store one or more images 16 that are extracted thereby as images files 28 in memory 20.

A neural network module 34 may be, include, or support an artificial neural network programmed to perform or apply deep learning. The deep learning performed or applied by an artificial neural network may use one or more algorithms to model high-level abstractions in data corresponding to one or more images 16. In selected embodiments, this may be accomplished by using multiple processing layers comprising multiple non-linear transformations.

In certain embodiments, an artificial neural network forming, supported by, or included within a neural network module 34 may operate in a training mode or an implementation mode. In training mode, the neutral network may train on multiple training images (e.g., dozens, hundreds, or thousands of training images). Some of those training images may be known to correspond to one class or condition (e.g., a rain condition), while others may be known to correspond to a different class or condition (e.g., a no rain condition). Once trained, an artificial neural network may be fed images 16 corresponding to unknown classes or condition.

Accordingly, in implementation mode, an artificial neural network corresponding to a neural network module 34 may analyze a single image 16 captured by a camera 14 (e.g., a single image 16 extracted from video captured by a camera 14) in order to classify a corresponding environment surrounding a vehicle 10 as being in one condition or another for some period of time (e.g., until a subsequent image 16 is classified). Alternatively, the artificial neural network may analyze multiple images (e.g., multiple consecutive images 16 extracted from video or a video file 26) captured by a camera 14 over a short period of time (e.g., several images captured over a period of about 1 second, 3 seconds, 5, seconds, 10 seconds, or the like).

In selected embodiments, the determination of an artificial neural network corresponding to a neural network module 34 may be presented for each image 16 analyzed in terms of percentages of confidence for each class or condition. If more than one image 16 is analyzed, a significant majority of those images 16 may be classified as a first condition (e.g., rain) in order to determine that the first condition is present in the environment of the vehicle 10. The neural network may make this determination even if a few of the images 16 are classified as a second condition (e.g., no rain).

An artificial neural network corresponding to a neural network module 34 may be trained while operating within or on the hardware of a system 12 carried on-board as part of the standard or option equipment of a production vehicle 10. Alternatively, an artificial neural network corresponding to a neural network module 34 may be trained while operating within or on the hardware a non-production system 12 (e.g., an off-board system 12 in a computer laboratory, a non-production system 12 carried on-board a test vehicle 10 specifically for the purposes of training, or the like), then "cloned" or otherwise copied onto or imported within a production system 12 forming part of a production vehicle 10.

In selected embodiments, a feedback module 36 may be included within a system 12 to support or enable on-board training of an artificial neural network corresponding to a neural network module 34. A feedback module 36 may provide information to a neural network module 34 that indicates which class or condition corresponds to which images 16. Thus, a feedback module 36 may enable a system 12 to generate training data on which to train (or improve the training of) a corresponding artificial neural network.

That is, in order to train a neural network, training data of a known class or condition may be analyzed by the neural network. It may not be enough for a system 12 to have images 16 collected by one or more on-board cameras 14. The system may also need to know which of those images 16 correspond to one class or condition and which correspond to another. This additionally information may be collected and provided by a feedback module 16.

For example, a feedback module 36 may note when a human driver turns on the windshield wipers, as this may indicate a rain condition. Accordingly, images 16 collected or captured at or near a time when the windshield wipers were turned on by a driver may be "known" to correspond to a first class or condition.

In selected embodiments, multiple functions or facts may be monitored by a feedback module 36 in order to gather information indicative of a current condition. For example, rather than just noting when a driver turns on the windshield wipers, a feedback module 36 may note when the driver turns on the windshield wipers without also activating the jets of windshield washer fluid. The latter may be more closely associated with rain in the environment surrounding a vehicle 10 than the former.

Other data and/or software 38 corresponding to a system 12 may support the operation of that system 12 as desired or necessary. In certain embodiments, other software 38 may include a control module programmed to request, initiate, or implement one or more actions or functions based on the classifications determined by a neural network module 34. For example, when a neural network module 34 determines based on one or more images 16 that it is raining, a control module may request, initiate, or implement changes such as activating certain wiper blades or lights, changing certain traction control settings, or otherwise preparing a corresponding vehicle 10 to deal with issues associated with a rain condition.

Figure 4:
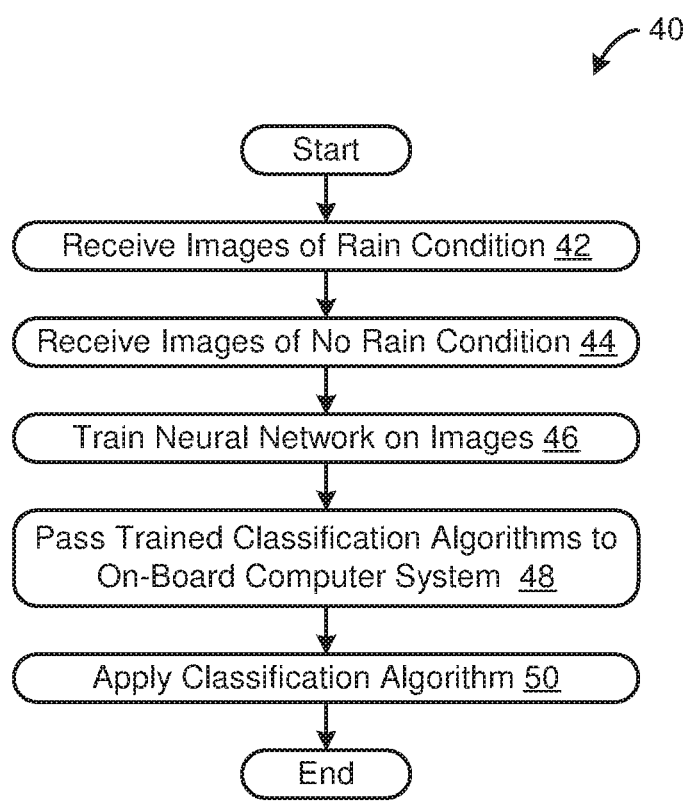
FIG. 4 is a schematic block diagram of one embodiment of a training method in accordance with the present invention.

Referring to FIG. 4, a system 12 may support, enable, or execute a process 40 in accordance with the present invention. In selected embodiments, such a process 40 may begin with receiving 42 images 16 corresponding to a first condition (e.g., a rain condition) and receiving 44 images 16 corresponding to a second condition (e.g., a no rain condition). An artificial neural network may then train 46 on those received images 16.

A trained artificial neural network (e.g., an artificial neural network comprising a set of classification algorithms that have proven effective in differentiating images corresponding to one class or condition from images corresponding to another class or condition) may then be passed 48 to (e.g., stored on) an on-board computer system 12 of a vehicle 10. The trained artificial neural network may then apply 50 classification algorithms corresponding thereto to images 16 collected or captured by one or more cameras 14 carried on-board that vehicle 10.

Figure 5:
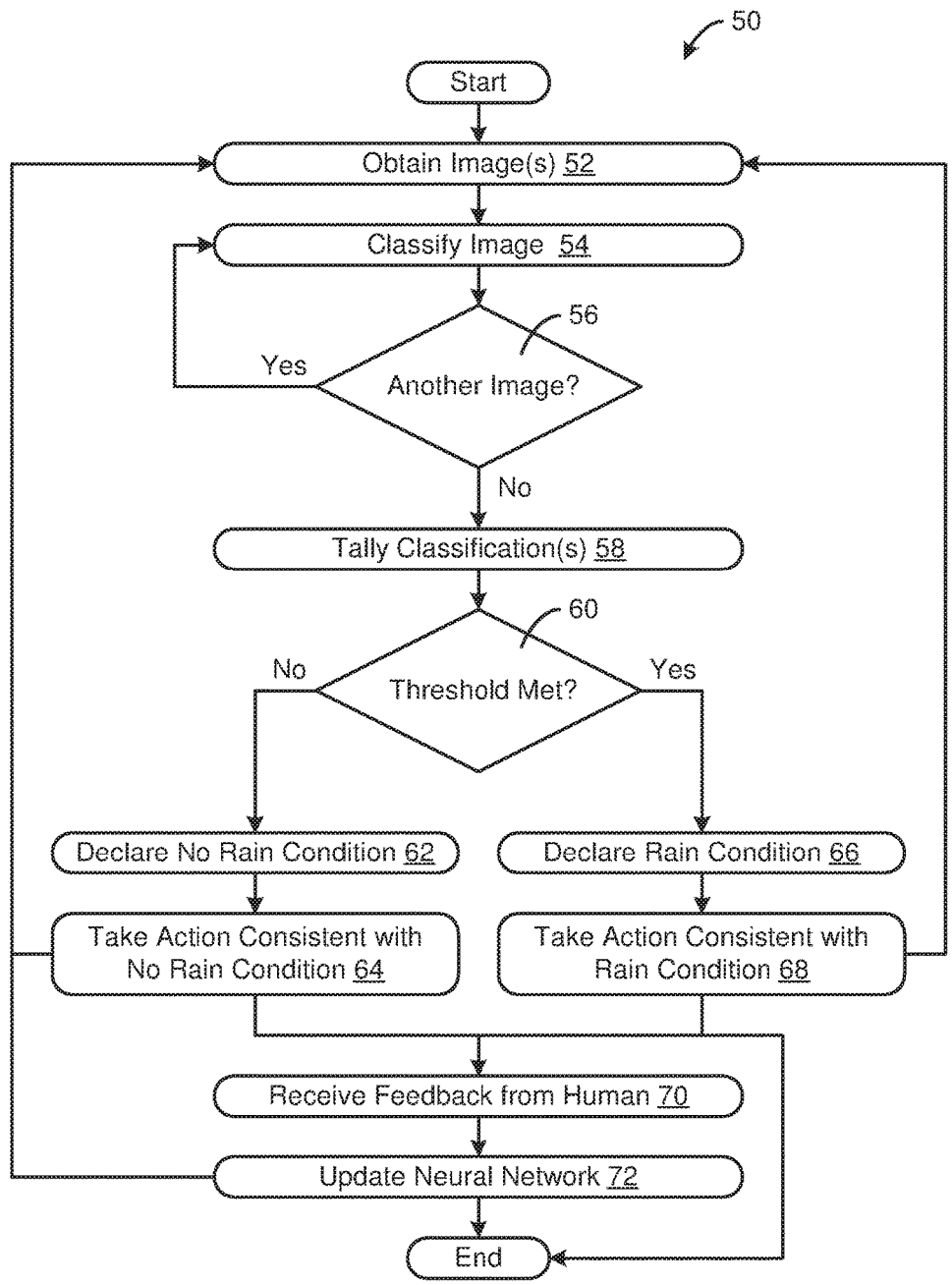
FIG. 5 is a schematic block diagram of one embodiment of a rain-detection method in accordance with the present invention.

Referring to FIG. 5, in selected embodiments, applying 50 the classification algorithms of an artificial neural network to one or more unclassified images 16 may begin with obtaining 52 the one or more unclassified images 16. Thereafter, one or those images 16 may be classified 54 by assigning for each such image 16 percentages of confidence for each class or condition.

For example, if an artificial neural network were trained to differentiate between two classes or conditions (e.g., a rain condition and a no rain condition), then the artificial neural network may output two percentages for each image 16. Specifically, the artificial neural network may output a first percentage indicative of the confidence that a particular image 16 corresponds to a first class and a second percentage indicative of the confidence that the particular image 16 corresponds to a second class. Accordingly, depending on the magnitude of the various percentages (e.g., whether the percentage for one class is above a particular threshold, the percentage for the other class is below a particular threshold, or both), the difference between the various percentages (e.g., whether the difference between the percentage for one class and the percentage for the other class is above a particular threshold), or the like or a combination thereof, the corresponding image 16 may be classified 54 as one class or condition or the other.

At some point, determination 56 may be made as to whether one or more images 16 are still in need of classification 54. If an image 16 is still in need of classification 54, that image 16 may be classified 54. This process may continue until all the unclassified images 16 have been classified 54.

Once the classification process 54 is complete, the one or more classifications made may be tallied 58. Accordingly, a determination 60 may be made as to whether the images as a whole are more indicative of one class or condition or another. If only one image 16 was classified 54, the tally 58 may identically track that classification 54. Alternatively, if multiple images 16 were classified 54 (e.g., multiple images 16 captured by a camera 14 over a short period of time), the tally 58 may indicate how many were classified 54 as pertaining to one class or condition and how many were classified 54 as pertaining to the other.

In selected embodiments, a determination 60 may be directed to whether a threshold has been met. Such a threshold may set at "50%." Accordingly, in a two class situation (e.g., rain or no rain), if one class or condition tallies higher than the other, the threshold may be met. Alternatively, a threshold may be set at something higher than 50% (e.g., somewhere in the range of about 55% to about 85%). In such embodiments or situations, an overall determination 60 as to whether a surrounding environment is indicative of one class or condition or the other may not be settled by which class or condition "wins" the tally 58. Rather, like a higher burden of proof in a legal proceeding, the threshold may ensure that a tally 58 does not just favor, but clearly or strongly favors one class or condition over the other. Accordingly, a threshold may be set to lower the number of false positives with respect to one class or condition (e.g., a rain condition).

If a tally 58 and/or determination 60 indicate that a first condition (e.g., a rain condition) is not present, an artificial neural network may declare 62 that a second condition (e.g., a no rain condition) is present and a system 12 may take 64 one or more actions consistent with that second condition. Such action may include leaving a vehicle 12 how it is, deactivating certain wiper blades or lights, changing certain traction control settings, or otherwise returning a corresponding vehicle 12 back to a "normal" operating condition corresponding to no rain. A system 12 may also enter a holding pattern and wait some period time (e.g., 10 seconds, 30 seconds, 1 minute, 5 minutes, 10 minutes, or the like) before obtaining 52 new images 16 and starting the classification process 54 again.

Conversely, if a tally 58 and/or determination 60 indicate that a first condition (e.g., a rain condition) is present, an artificial neural network may declare 66 that the first condition is present and a system 12 may take 68 one or more actions consistent with that first condition. Such action may include leaving a vehicle 12 how it is, activating certain wiper blades or lights, changing certain traction control settings, or otherwise preparing a corresponding vehicle 12 back to adapt to an "abnormal" operating condition corresponding to rain. A system 12 may also enter a holding pattern and wait some period time (e.g., 10 seconds, 30 seconds, 1 minute, 5 minutes, 10 minutes, or the like) before obtaining 52 new images 16 and starting the classification process 54 again.

In selected embodiments, at some point within a process 50 in accordance with the present invention, a system 12 may receive 70 feedback from a human (e.g., a human driver). This feedback may indicate which class or condition corresponds to which images 16. Accordingly, the feedback and the corresponding images 16 may become training data used to update 72 and/or retrain an artificial neural network. Alternatively, or in addition thereto, such feedback may be used to adjust or fine tune one or more thresholds (e.g., percentage threshold, tally thresholds) used in the process 50.

The flowcharts in FIGS. 4 and 5 illustrate the architecture, functionality, and operation of possible implementations of systems, methods, and computer-program products according to various embodiments in accordance with the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
    obtaining multiple images, each known to photographically depict a "rain" or a "no rain" condition;
    training, by an artificial neural network, on the multiple images;
    analyzing, by the artificial neural network after the training, a plurality of consecutive images captured by a first camera;
    classifying, by the artificial neural network based on the analyzing, each image of the plurality of consecutive images as being in "rain" or "no rain" weather;
    (a) determining that a major portion of the plurality of consecutive images have been classified as in "rain" weather; and
    in response to (a), modifying operation of the vehicle.

2. The method of claim 1, wherein the multiple images are captured by one or more cameras on-board one or more vehicles.

3. The method of claim 1, wherein the first camera is on-board a first vehicle.

4. The method of claim 3, wherein the analyzing occurs on-board the first vehicle.

5. The method of claim 4, wherein the classifying occurs on-board the first vehicle.

6. The method of claim 3, wherein the training occurs off-board the first vehicle.

7. The method of claim 3, wherein the training occurs while the artificial neural network is running on off-board computer hardware located remotely with respect to the first vehicle.

8. The method of claim 3, wherein the analyzing and the classifying occurs while the artificial neural network is running on on-board computer hardware carried on-board the first vehicle.

9. The method of claim 1, wherein the first camera is secured to a first vehicle and oriented so as to be forward facing.

10. The method of claim 1, wherein the first camera is secured to a first vehicle and oriented so as to be rearward facing.

11. The method of claim 1, wherein the plurality of consecutive images comprise multiple consecutive images captured by the first camera over a period of less than ten seconds.

12. A method comprising:
    obtaining a first plurality of images captured by one or more cameras on-board one or more vehicles, each image of the first plurality of images being known to photographically depict a "rain" or a "no rain" condition;
    using the first plurality of images to train an artificial neural network to distinguish between photographic data corresponding to the rain condition and photographic data corresponding to the no rain condition;
    analyzing, by the artificial neural network after the using, a second plurality of consecutive images captured by a first camera secured to a first vehicle;
    classifying, by the artificial neural network based on the analyzing, each image of the second plurality of consecutive images as being in "rain" or "no rain" weather;
    (a) determining that a major portion of the second plurality of consecutive images have been classified as in "rain" weather; and
    in response to (a), producing an output modifying operation of a vehicle.

13. The method of claim 12, wherein the analyzing and the classifying occurs while the artificial neural network is running on on-board computer hardware carried on-board the first vehicle.

14. The method of claim 12, further comprising capturing, by the first camera, the second plurality of consecutive images.

15. The method of claim 14, wherein the analyzing and the classifying occur in real time with the capturing.

16. The method of claim 15, wherein the analyzing and the classifying occur less than ten seconds after the capturing.

17. The method of claim 12, wherein the using occurs while the artificial neural network is running on off-board computer hardware located remotely with respect to the first vehicle.

18. The method of claim 12, wherein the second plurality of consecutive images comprise multiple consecutive images captured by the first camera over a period of less than ten seconds.

19. A computer system comprising:
one or more processors;
memory operably connected to the one or more processors; and
the memory storing
an artificial neural network trained on a plurality of images captured by one or more cameras on-board one or more vehicles to distinguish between images corresponding to a "rain" condition and images corresponding to a "no rain" condition;
a plurality of consecutive images captured by a first camera secured to a first vehicle; and
software programmed to cause the one or more processors to—
feed the plurality of consecutive images to the artificial neural network for classification;
when a majority of the plurality of consecutive images are classified by the artificial neural network as corresponding to the "rain" condition thereby indicating a transition from the "no rain" to the "rain" condition, change a functional characteristic of the first vehicle.

* * * * *